(12) United States Patent
Harrington

(10) Patent No.: US 6,507,676 B1
(45) Date of Patent: Jan. 14, 2003

(54) HEXAGONAL AND OCTAGONAL REGIONS FROM SUMMED-AREA TABLES

(75) Inventor: Steven J. Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/459,655

(22) Filed: Dec. 13, 1999

(51) Int. Cl.⁷ .............................. G06K 9/36; G09G 5/00
(52) U.S. Cl. ........................................ 382/276; 345/582
(58) Field of Search ................................ 382/276, 294, 382/154; 345/418, 422, 581, 582, 596, 648

(56) References Cited

U.S. PATENT DOCUMENTS

| | | | | |
|---|---|---|---|---|
| 4,851,825 A | * | 7/1989 | Naiman ....................... | 345/596 |
| 5,550,960 A | * | 8/1996 | Shirman et al. ............ | 345/582 |
| 5,651,104 A | * | 7/1997 | Cosman ....................... | 345/428 |
| 6,031,934 A | * | 2/2000 | Ahmad et al. .............. | 382/154 |

OTHER PUBLICATIONS

"MIP–Map Level Selection for Texture Mapping," Ewins et al., IEEE Trans. on Visualization and Computer Graphics, vol. 4, No. 4, Oct–Dec. 1998, pp. 317–329.*
"Algorithms for Graphics Texture Mapping," Dudgeon et al., Proceedings of Twenty–Third Southeastern Symposium on System Theory, 1991, pp. 613–617.*
Summed–Area Tables for Texture Mapping, Franklin C. Crow, Computer Graphics, vol. 18, No. 3, Jul. 1984, pp. 207–212.

* cited by examiner

Primary Examiner—Wenpeng Chen
(74) Attorney, Agent, or Firm—Oliff & Berridge, PLC

(57) ABSTRACT

Systems and methods for determining the texture of the images to be processed are provided. An image data manager is provided that is capable of generating summed-area tables to be applied in texture mapping for texture that have no special direction or orientation, by generating summed-area tables for areas that best approximate circles. The image data manager uses the generated summed-area tables to process the image data. The summed-areas tables applied include a hexagon and an octagon. Accordingly, problems in processing images having textures that have no special direction or orientation, are reduced or eliminated.

14 Claims, 9 Drawing Sheets

HEXAGONAL AND OCTAGONAL REGIONS FROM SUMMED-AREA TABLES

BACKGROUND OF THE INVENTION

1. Field of Invention

This invention is directed to methods and systems that process images using summed-area tables.

2. Description of Related Art

Digitally reproducing, transferring and/or displaying various types of images presently occurs using a variety of devices and systems in a variety of environments. A digital image may be input into a device, processed, and then output from the device, for example. In some applications, it may be necessary or desirable to process the image between the inputting at one device and outputting the data from that one device for the specific purpose of using the processed image data by another device. In other applications, it may be necessary or desirable to process the input image for some particular application within a device itself.

In image processing, images are represented in a wide variety of manners. Various techniques have been implemented in image processing.

SUMMARY OF THE INVENTION

In various exemplary embodiments of image processing, summed-area tables are used for processing the image. In these exemplary embodiments, a summed-area table has an entry for each pixel of the image. Each such entry is the sum of all values in the rectangular region with one corner of the region at the corner of the image, for example, the upper left corner, and the opposing corner of the region at the pixel.

This invention provides systems and methods that is generate non-rectangular summed-area tables.

This invention separately provides an image data manager that generates non-rectangular summed-area tables to process the image data.

In accordance with the systems and methods of this invention, the manager is capable of generating summed-area tables for areas that approximate circles.

Various exemplary embodiments of the summed areas usable with the summed-areas tables and systems and methods for generating and using these summed area tables according to this invention include non-rectangular regions.

In various exemplary embodiments of image processing systems using the systems and methods of this invention, problems in processing images having textures that have no special direction or orientation can be reduced or eliminated.

These and other features and advantages of the systems and methods of this invention are described in or are apparent from the following detailed description of the exemplary embodiments.

BRIEF DESCRIPTION OF THE DRAWINGS

The exemplary embodiments of this invention will be described in detail, with reference to the following figures, wherein.

DETAILED DESCRIPTION OF PREFERRED EMBODIMENTS

Figure 1:
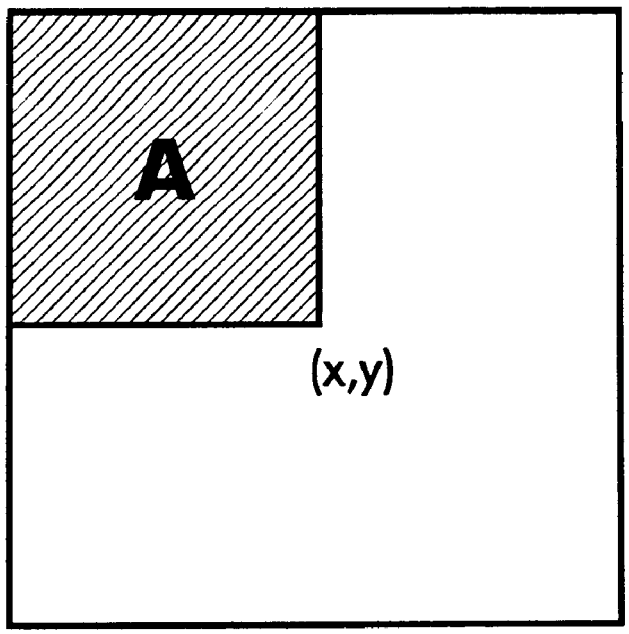
FIGS. 1 and 2 illustrate conventional rectangular regions used to generate summed-area tables.

FIG. 1 shows one exemplary embodiment of an area for summed-area tables used for processing the image. In this exemplary embodiment, a single table has an entry for each pixel of the image. Each such entry is the sum of all values in the rectangular region with one corner of the region at the corner of the image, for example, the upper left corner, and the opposing corner of the region at the pixel. The sum of all intensities in any rectangular region of the image may easily be recovered from such a table. Dividing the sum by the area of the rectangular region gives the average intensity over the rectangular region.

As shown in FIG. 1, the table entry at position (x,y) contains the sum of the values for all pixels in area A. The summed-area table entries are given by:

$$S(x, y) = \sum_{j=0}^{y} \sum_{i=0}^{x} I(i, j) \tag{1}$$

where:

x indicates the position of the current pixel along a row, y indicates the row of the current pixel, S(x,y) is the summed-area value for the pixel (x,y), and I(i,j) is the image value of the pixel (i,j).

When the pixels of an image are read in a scanning order, i.e, the row direction, an intermediate sum $T_y(x)$ is used for all the pixels on the current row, or scan line, y. That is, $T_y(x)$ for each new pixel is determined as:

$$T_y(x)=T_y(x-1)+I(x,y) \tag{2}$$

where:

I(x,y) is the image value of the pixel (x,y), $T_y(x)$ is the intermediate sum for the pixel (x,y), and $T_y(x-1)$ is the previous intermediate sum.

The summed-area table value for a particular pixel of interest in the image will be the value for the area above and left of that pixel plus the sum for the current scan line to that pixel. That is, the sum is determined as:

$$S(x,y)=S(x,y-1)+T_y(x) \tag{3}$$

where:

S(x,y) is the summed-area value for the pixel (x,y), $T_y(x)$ is the intermediate sum for the pixel (x,y), and S(x,y—1) is the summed-area value for the pixel (x, y−1), i.e., the image value for the area above and left of the pixel (x,y).

Figure 2:
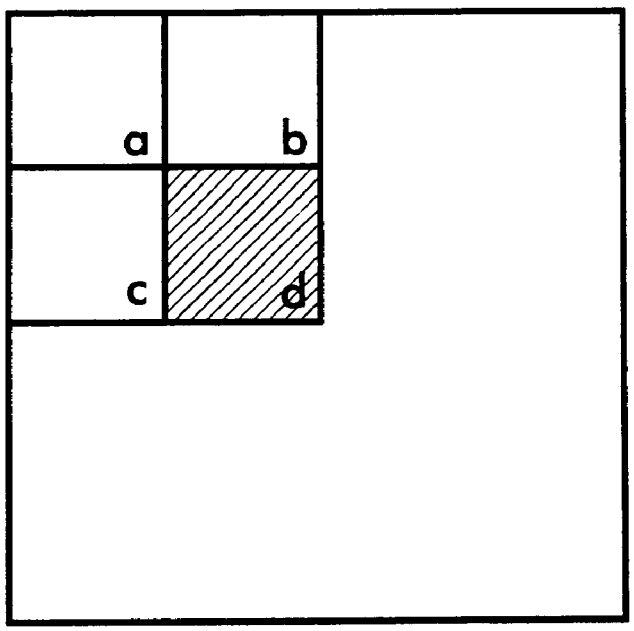

The summed-area table allows the sum of values for any rectangular area of pixels to be determined. This is done by adding or subtracting the summed-area table values at the rectangle corners. As shown in FIG. 2, the area of the rectangle a, b, c, d is:

$$S(x_d, y_d) - S(x_c, y_c) - S(x_b, y_b) + S(x_a, y_a) \quad (4)$$

where:

$S(x_d, y_d)$ is the summed-area value at point $(x_d, y_d)$,
$S(x_c, y_c)$ is the summed-area value at point $(x_c, y_c)$,
$S(x_b, y_b)$ is the summed-area value at point $(x_b, y_b)$, and
$S(x_a, y_a)$ is the summed-area value at point $(x_a, y_a)$.

In other words, starting with the table entry at the lower right corner of the area, the table entry at the lower left is subtracted and then the entry at the upper right is subtracted. This removes all area above the rectangle of interest then all area to the left. The area lying above and to the left of the rectangle has been subtracted twice. This area must be restored by adding back in the table entry at the upper left of the rectangle.

For image processing, if, for example, the value of a pixel is to be replaced with the average value of a region surrounding it, the summed-area table can give the sum of the values for a rectangular region surrounding the pixel. Dividing this sum by the size of the area yields the desired average value.

However, rectangular regions are often not the ideal shaped regions for various image processing functions, such as, for example, creating and processing textures in an image. In the exemplary embodiment of texture creating and processing, as an electronic image is synthesized, a pair of texture coordinates is determined for each pixel representing a textured surface. Textures coordinates may be determined for the corners of each region, and pixel intensity, for example, can be determined from the average of all texture elements bounded by the corners of the region.

For such image processing functions, regions that more closely approximate a circular region are often more useful. However, previously, only rectangularly-shaped regions were available. In various exemplary embodiments of this invention, summed-area tables that enable regions having more than four sides to be used. Using summed-area tables that enable such non-rectangular regions enables more effective image processing for some types of image processing functions. In particular, the following discussion refers to hexagonal and octagonal regions. However, it should be appreciated that the techniques described herein are readily extendible to polygonal regions having any number, even or odd, of sides. Using hexagonal regions takes about twice the storage and effort of the rectangular regions. The octagonal regions take about three times the storage and processing. To use hexagonal regions, two summed-area tables are used, and the areas involved are triangles rather than rectangles.

Figure 3A:
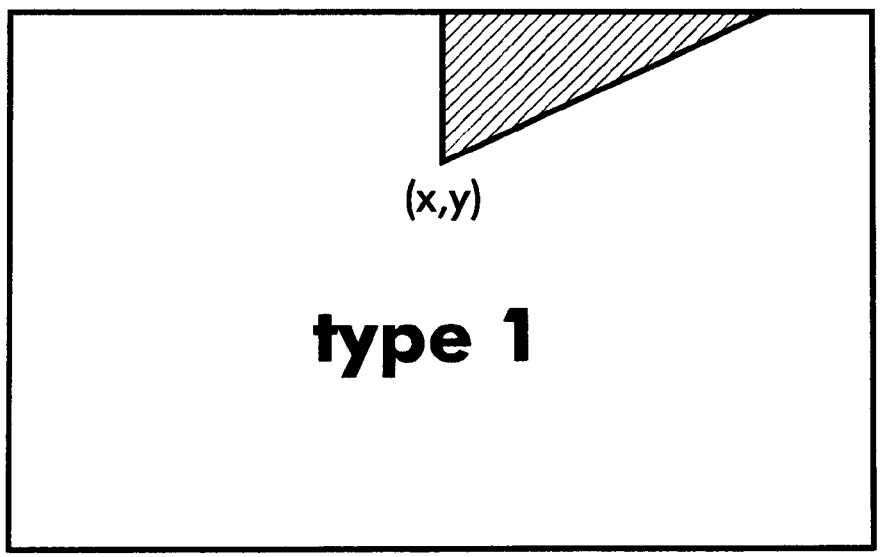
FIGS. 3–8 show various exemplary embodiments of non-rectangular regions for summed-area tables used for processing the image in accordance with the methods and systems of this invention.
Figure 3B:
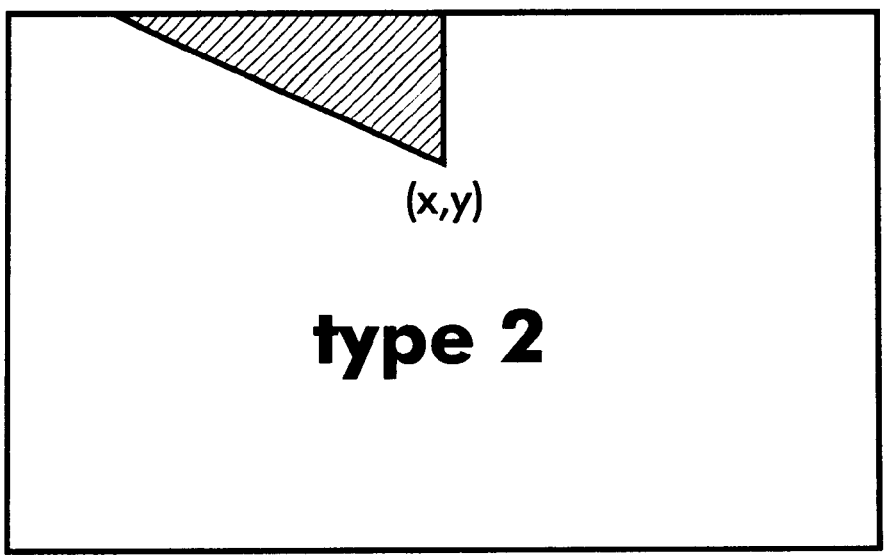

FIGS. 3A and 3B show in detail one exemplary embodiment of two types of triangular regions usable to create non-rectangular summed-area regions. In this exemplary embodiment, triangular regions having hypotenuses that have a slope of ±½ are used. Corresponding angles occur in hexagonal regions. However, it should be appreciated that other slopes may be used, corresponding to shapes having different numbers of sides. The type 1 triangular region shown in FIG. 3A has a hypotenuse that slants upwardly while the hypotenuse of the type triangular region 2 shown in FIG. 3B slants downwardly. The values for the entries in these summed-area tables can be defined as follows:

$$S1(x, y) = \sum_{j=0}^{y} \sum_{i=x}^{x+2(y-j)} I(i, j); \text{ and} \quad (5)$$

$$S2(x, y) = \sum_{j=0}^{y} \sum_{i=x-2(y-j)}^{x} I(i, j);$$

where:

S1(x,y) is the summed-area value at the pixel (x,y) for a type 1 triangular region,
S2(x,y) is the summed-area value at the pixel (x,y) for a type 2 triangular region, and
I(i,j) is the image value at the pixel (i,j).

As with the summed area tables for the rectangular regions, these two summed-area tables for the triangular regions shown in FIGS. 3A and 3B can be constructed incrementally in the scanning direction. To do so, an array of column sums is maintained. The value in this array $C_y(x)$ is the sum of entries from row zero to y in column x. This requires a scanline worth of table entries that are updated as each new row is processed. With these column sums, the areas are given by:

$$S1(x,y) = I(x,y) + C_{y-1}(x) + C_{y-1}(x+1) + S1(x+2, y-1); \quad (6)$$

$$S2(x,y) = I(x,y) + C_{y-1}(x) + C_{y-1}(x-1) + S2(x-2, y-1); \text{ and} \quad (7)$$

$$C_y(x) = C_{y-1}(x) + I(x,y), \quad (8)$$

where:

S1( ) is the summed-area value at the pixel ( ) of a type 1 triangular region,
S2( ) is the summed-area value at the pixel ( ) of a type 2 triangular region,
I( ) is the image value at the pixel ( ),
$C_y$( ) is sum of entries from row zero to y in column ( ), and
$C_{y-1}$( ) is sum of entries from row zero to y−1 in column ( ), That is, the summed-area value at the pixel (x,y) of a type 1 triangular region having an upward hypotenuse is the sum of: 1) the image value at the pixel (x,y), 2) the sum of entries from row zero to y−1 in column x, 3) the sum of entries from row zero to y−1 in column x+1, and 4) the summed-area value of a type 1 triangular region at the pixel (x+2,y−1). Similarly, the summed-area value at the pixel (x,y) of a type 2 triangular region having a downward hypotenuse is the sum of: 1) the image value at the pixel (x,y), 2) the sum of entries from row zero to y−1 in column x, 3) the sum of entries from row zero to y−1 in column x−1, and 4) the summed-area value of a type 2 triangular region at the pixel (x−2,y−1). The sum of entries from row zero to y in column x is the sum of entries from row zero to y−1 in column x and the image value at the pixel (x,y).

Figure 4:
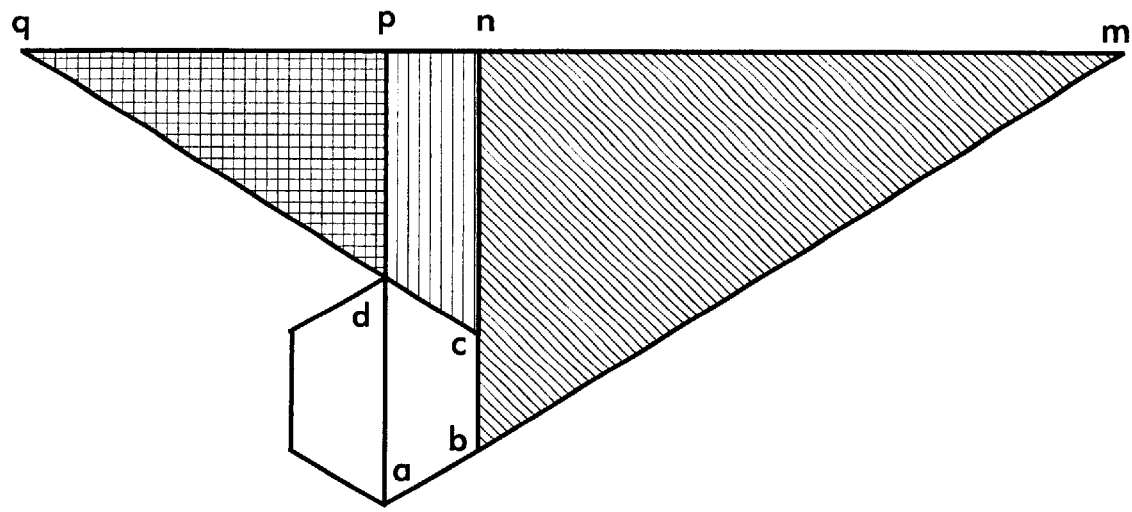

FIG. 4 shows how the area of half a hexagonal region can be determined using triangular areas to find the sum of values in the hexagonal region. The half hexagonal region-"abcd" can be formed from the area of the triangular region "amp" minus the area of the triangular region "bmn" minus the area of the triangular region "cnq" and plus the area of the triangular region "dpq." The left half of the hexagonal region shown in FIG. 4 can be found similarly by just reflecting the diagram left-to-right. The triangular regions represent the values in the summed-area tables.

Figure 5:
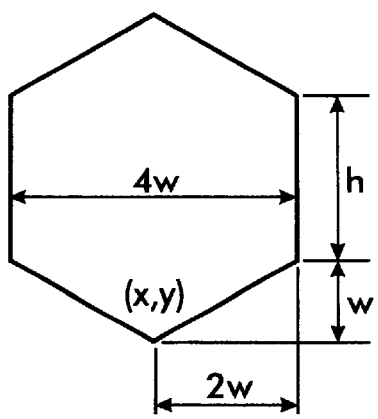

FIG. 5 shows the dimensions and locations of an exemplary hexagonal region. The sum of values within this hexagonal region will be given by:

$$H=S1(x,y)-S1(x+2w,y-w)-S2(x-1+2w,y-w-h)+S2(x-1, y-2w-h)+$$
$$S2(x-1,y)-S2(x-1-2w, y-w)-S1(x-2w, y-w-h)+S1(x, y-2w-h) \quad (9)$$

where:
- w is one fourth of the width of the hexagonal region, as shown in FIG. 5,
- h is the length of an edge of the hexagonal region, as shown in FIG. 5,
- H is the sum of values within the hexagonal region,
- S1( ) is the summed-area value for a triangular region at the pixel ( ) having an upward hypotenuse, and
- S2( ) is the summed-area value for a triangular region at the pixel ( ) having a downward hypotenuse.

Thus, summed area H of the hexagonal region is the sum of two half hexagonal regions, determined using the technique discussed above. That is, the summed hexagonal area H of the hexagonal region is the sum of the area of half hexagonal regions [$S1(x,y)-S1(x+2w, y-w)-S2(x-1+2w, y-w-h)+S2(x-1, y-2w-h)$] and the area of the half hexagonal regions [$S2(x-1,y)-S2(x-1-2w,y-w)-S1(x-2w,y-w-h)+S1(x,y-2w-h)$]. As shown in FIG. 5, the number of pixels within the region is $4w(w+h)$.

In order to determine the sum of values for an octagonal region, a summed-area table for a rectangular region and two triangular-region summed-area tables are used. For the octagon, triangular regions having a slope of 1 may be used. The table entries for the type 1 triangular region, the type 2 triangular region and the rectangular region would then be defined respectively as:

$$S1(x, y) = \sum_{j=0}^{y} \sum_{i=x}^{x+y-j} I(i, j); \quad (10)$$

$$S2(x, y) = \sum_{j=0}^{y} \sum_{i=x-y+j}^{x} I(i, j); \text{ and} \quad (11)$$

$$S3(x, y) = \sum_{j=0}^{y} \sum_{i=0}^{x} I(i, j); \quad (12)$$

where:
- $S1(x,y)$ is the summed-area value at the pixel (x,y) of a type 1 triangular region,
- $S2(x,y)$ is the summed-area value at the pixel (x,y) of a type 2 triangular region,
- $S3(x,y)$ is the summed-area value at the pixel (x,y) of a rectangular region, and
- $I(i,j)$ is the image value at the pixel (i,j).

The table can be incrementally constructed according to:

$$S1(x,y)=I(x,y)+C_{y-1}(x)+S1(x+1, y-1),$$
$$S2(x,y)=I(x,y)+C_{y-1}(x)+S2(x-1, y-1), \text{ and}$$
$$S3(x,y)=I(x,y)+C_{y-1}(x)+S3(x-1, y); \quad (14)$$

where:
- S1( ) is the summed-area value at the pixel ( ) of a type 1 triangular region,
- S2( ) is the summed-area value at the pixel ( ) of a type 2 triangular region,
- S3( ) is the summed-area value at the pixel ( ) of a rectangular region,
- I( ) is the image value at the pixel ( ),
- $C_y$( ) is sum of entries from row zero to y in column ( ), and
- $C_{y-1}$( ) is sum of entries from row zero to y−1 in column ( ).

That is, the summed-area value at the pixel (x,y) of a type 1 triangular region having an upward hypotenuse is the sum of: b 1) the image value at the pixel (x,y), 2) the sum of entries from row zero to y−1 in column x, and 3) the summed-area value of a type 1 triangular region at (x+1,y−1). Similarly, the summed-are value at the pixel (x,y) of a type 2 triangular region having a downward hypotenuse is the sum of: 1) the image value at the pixel (x,y), 2) the sum of entries from row zero to y−1 in column x, and 3) the summed-are value of a type 2 triangular region at the pixel (x−1,y−1). The summed-area value at the pixel (x,y) of a rectangular region is the sum of: 1) the image value at the pixel (x,y), 2) the sum of entries from row zero to y−1 in column x, and 3) the summed-area value of a rectangle at (x−1, y).

As in the hexagonal case, the sum of entries is determined as:

$$C_y(x)=C_y-1(x)+I(x,y) \quad (15)$$

Figure 6:
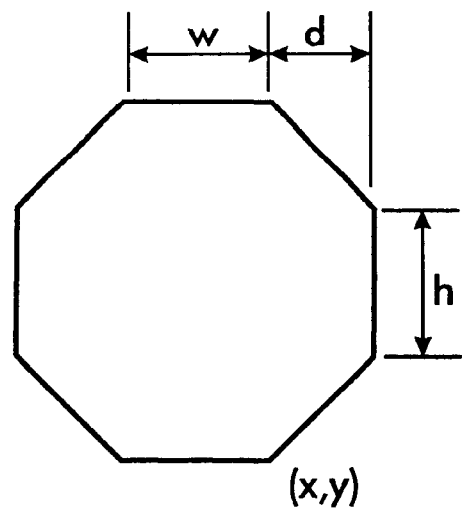

As shown in FIG. 6, the octagon can be divided into two half-hexogonal regions separated by a rectangular region. The half-hexagonal regions can be determined from the two triangle summed-area tables, as was done above for the hexagonal region. The rectangular region can be determined using the conventional rectangular-region summed-area table as discussed above.

The sum of the values in the octagonal region shown in FIG. 6 is determined to be:

$$R=S1(x,y)-S1(x+d, y-d)-S2(x-1+d, y-d-h)+$$
$$S2(x-1, y-2d-h)+$$
$$S2(x-1-w,y)-S1(x-1-w-d, y-d)-$$
$$S1(x-w-d,y-d-h)+$$
$$S1(x-w,y-2d-h)+S3(x-1,y)-$$
$$S3(x-1-w,y)-$$
$$S3(x-1, y-2d-h)+S3(x-1-w,y-2d-h) \quad (16)$$

where:
- w is the length of the horizontal edge of the octagonal region, as shown in FIG. 6,
- h is the length of the vertical edge of the octagonal region, as shown in FIG. 6,
- d is the distance between the vertical edge and the rectangular region in the octagonal region, as shown in FIG. 6,
- R is the sum of values within the octagonal region,
- S1( ) is the summed-area value for a type 1 triangular region at ( ) having an upward hypotenuse,
- S2( ) is the summed-area value for a type 2 triangular region at ( ) having a downward hypotenuse, and
- S3( ) is the summed-area value for a rectangular region at ( ).

Thus, the octagonal region R is the sum of two half-hexagonal regions and a rectangular region, determined using the technique discussed above. That is, the octagonal region R is the sum of the half-hexagon region [$S1(x,y)-S1(x+d, y-d)-S2(x-1+d, y-d-h)+S2(x-1, y-2d-h)$], the half-hexagonal region [$S2(x-1-w,y)-S2(x-1-w,y-d)-S1(x-w-d,y-d-h)+S1(x-w,y-2d-h)$], and the rectangular region [$S3(x-1, y)-S3(x-1-w, y)-S3(x-1, y-2d-h)+S3(x-$ 1−w, y−2d−h)]. As shown in FIG. 6, number of pixels in the octagonal region is determined to be wh+2d(d+w+h).

Figure 7:
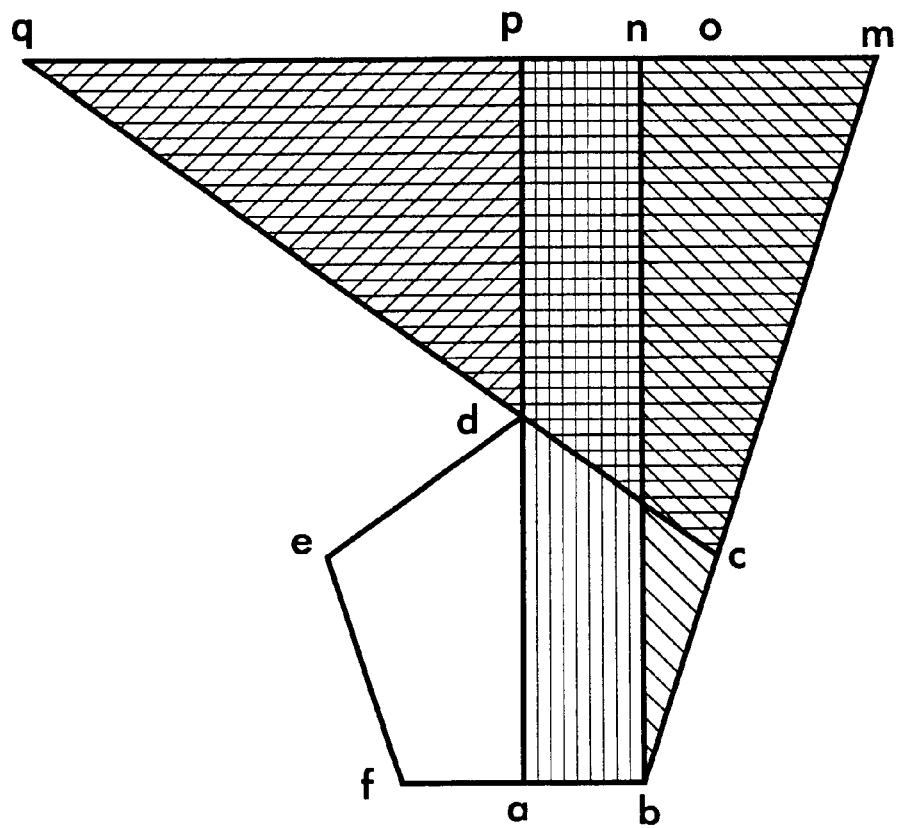
Figure 8:
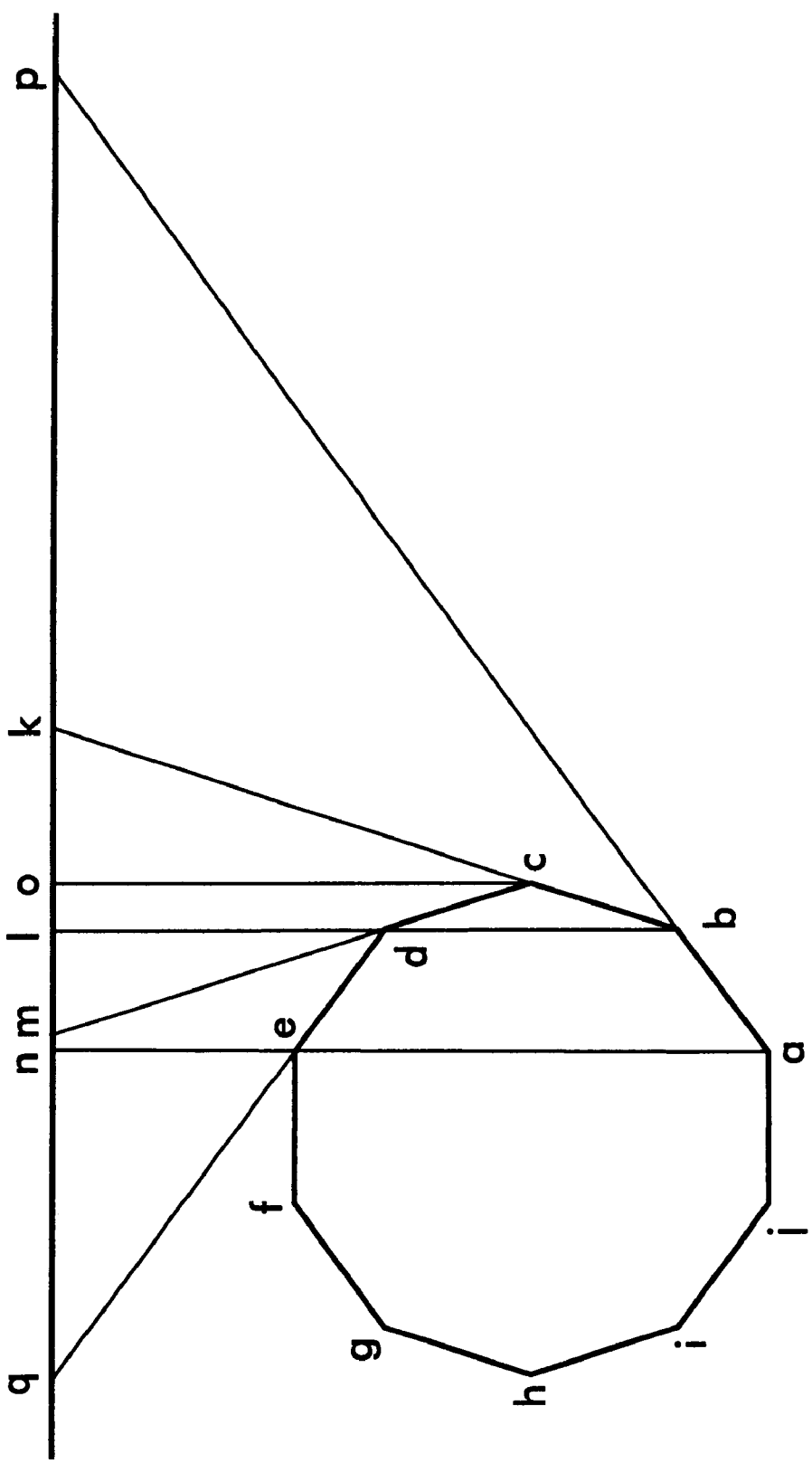

Though exemplary embodiments of a hexagonal region and an octagonal region are shown above, it should be appreciated that, as discussed above, any summed-area tables that enable regions having more than four sides may be used. It should be appreciated that the techniques described above are readily extendible to polygonal regions having any number, even or odd, of sides. As shown in FIGS. 7–8, the polygonal regions may include a region having an odd number of sides, such as a pentagonal region, or a region having an even number of sides, such as a decagonal region. As with the hexagonal and octagonal regions, triangular regions may be used to determine the sum of values in these polygonal regions. As with the hexagonal and octagonal regions, the triangular regions represent the values in the summed-area tables.

As shown in FIG. 7, the half pentagonal region "abcd" can be formed from the area of the rectangular region "abnp" plus the area of the triangular region "bmn" minus the area of the triangular regions "cmo" and "coq" plus the area of the triangular region "dpq". The left half of the pentagonal region shown in FIG. 7 can be found similarly by reflecting the diagram left-to-right.

In particular, it should be appreciated that the triangular regions "bmn" and "cmo" have hypotenuses having different slopes than the hypotenuses of the triangular regions "coq" and "dpq". In general, the hexagonal and octagonal regions require only one set of type 1 and type 2 triangular regions, because there is only one angle that the sides of each such region make relative to a vertical, or horizontal, axis of the image. In contrast, any other non-rectangular polygon will have sides that make at least two angles relative to the vertical, or horizontal, axis of the image. For example, the sides "bc" and "ef" make a first angle with the vertical axis in FIG. 7, while the sides "cd" and "de" make a second angle with the vertical axis. Accordingly, to generate pentagonal regions, two sets of type 1 and type 2 triangular regions, each set having hypotenuses that correspond to one of the first and second angles, are required. In general, to form a polygonal region having an arbitrary number of sides, as many sets of the type 1 and type 2 triangular regions will be required as there are angles made by the sides of the polygonal region with a vertical, or horizontal, axis of the image.

It should also be appreciated that the type 1 and type 2 triangular regions include trapezoidal portions that result because the triangular regions may extend beyond the boundaries of the image.

As shown in FIG. 8, the decagonal regions "abcdefghij" can be formed by adding to the rectangular region "aefj" the triangular regions "apn", "blk", "dlm", and "enq", and then subtracting the triangular regions "blp", "cko", "cmo" and "dlq". That is, the region "abde" is formed by subtracting the triangular regions "blp" and "del" from the triangular region "apn" and adding back triangular region "enq". The region "bcd" is then formed by subtracting the triangular regions "cmo" and "cko" from triangular region "blk", and adding back triangular region "dlm".

As in the pentagonal region shown in FIG. 7, the sides of the decagonal region shown in FIG. 8 make two distinct angles with the vertical, or horizontal, axis of the image. Thus, two sets of the type 1 and type 2 triangular regions are required to form the decagonal region shown in FIG. 8.

Alternatively, the decagonal region "abcdefghij" can be formed from the area of a octagonal region "abdefgij" plus the area of the triangular regions "bcd" and "igh". The area of the octagonal region "abdefgij" can be determined using the determination discussed above for octagonal regions except that the angles made by the octagonal region "abdefgij" are different than the angles made by the octagonal region shown in FIG. 6. The triangular region "bcd" can be formed as discussed above. The areas of the pentagonal region "fghij" or the triangular region "igh" can be found similarly by just reflecting the diagram left-to-right.

As shown above, summed-area tables that enable polygonal regions having any number, even or odd, of sides may be used in the methods and systems of this invention. Using summed area tables for triangular regions, the sum of values in these polygonal regions can be determined.

Summed-area tables are used in the image processing of an entire image where determinations are done for each pixel in scanning order. In these applications the point positions just increment from one pixel to the next and their indexing is a simple stepping through the table.

Figure 9:
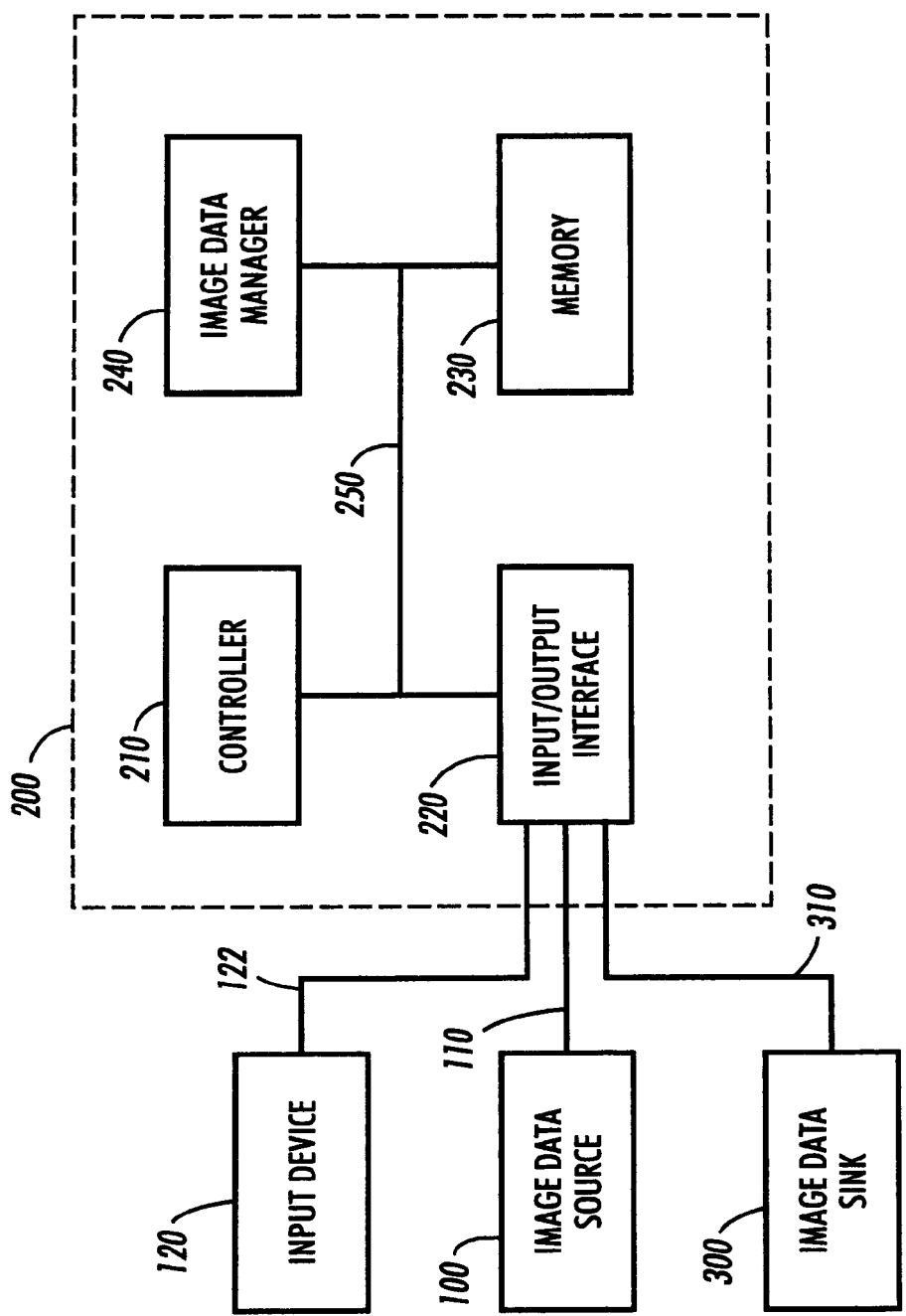
FIG. 9 is a functional block diagram of one exemplary embodiment of a image processing system in accordance with the systems and methods of this invention.

FIG. 9 shows one exemplary embodiment of an image processing apparatus 200 incorporating the non-rectangular scanned area generating systems and methods in accordance with this invention. As shown in FIG. 9, an image data source 100 and an input device 120 are connected to the image processing apparatus 200 over the links 110 and 122, respectively. The image data source 100 can be a digital camera, a scanner, or a locally or remotely located computer, or any other known or later developed device that is capable of generating electronic image data. Similarly, the image data source 100 can be any suitable device that stores and/or transmits electronic image data, such as a client or a server of a network. The image data source 100 can be integrated with the image processing apparatus 200, a in a digital copier having an integrated scanner. Alternatively, the image data source 100 can be connected to the image processing apparatus 200 over a connection device, such as a modem, a local area network, a wide area network, an intranet, the Internet, any other distributed processing network, or any other known or later developed connection device.

It should also be appreciated that, while the electronic image data can be generated at the time of printing an image from an original physical document, the electronic image data could have been generated at any time in the past. Moreover, the electronic image data need not have been generated from the original physical document, but could have been created from scratch electronically. The image data source 100 is thus any known or later developed device which is capable of supplying electronic image data over the link 110 to the image processing apparatus 200.

The image data sink 300 can be any known or later developed device that is capable of receiving image data output by the image processing apparatus 200 over link 310 and either storing, transmitting, and/or displaying that processed image data. Thus, the image data sink 300 can be either or both of a channel device for transmitting the processed image data for display or storage or a storage device for indefinitely storing the processed image data until there arises a need to display or further transmit the processed image data.

Further, the image data sink 300 or channel device can be any known structure or apparatus for transmitting the processed image data from the image processing apparatus 200 to a physically remote storage or display device. Thus, the channel device can be a public switched telephone network, a local or wide area network, an intranet, the Internet, a wireless transmission channel, any other distributing network, or the like. Similarly, the storage device can be any known structural apparatus for indefinitely storing the processed image data, such as a RAM, a hard drive and disk, a floppy drive and disk, an optical drive and disk, a flash memory or the like. Finally, the display device can be any known device for displaying or rendering an image. Thus, the display device can be a CRT, an active or passive matrix LCD, an active or passive LED display, a laser printer, an ink jet printer, a digital copier, or the like.

Moreover, the image data source 100 and the image data sink 300 can be physically remote from the image processing apparatus 200 and reachable over the channel device described above. Alternatively, the image processing apparatus 200 can be integrated with either or both of the image data source 100 and the image data sink 300. For example, the image data source 100 can be a scanner of a digital photocopier, while the image data sink 300 is an image output terminal of the digital photocopier.

The link 110 can thus be any known or later developed system or device for transmitting the electronic image data from the image data source 100 to the image processing apparatus 200. The link 110 may include, but are not limited to, wired or wireless communication links such as conventional telephone lines, fiber optic lines, coaxial cable lines, satellite or cellular communication links, and the like. Similarly, the link 310 can be any known or later developed system or device for transmitting the electronic image data from the image processing apparatus 200 to the image data sink 300.

The input device 120 can be any known or later developed device for providing control information from a user to the image processing apparatus 200. Thus, the input device 120 can be a control panel of the image processing apparatus 200, or could be a control program executing on a locally or remotely located general purpose computer, or the like. As with the links 110 and 310 described above, the link 122 can be any known or later developed device for transmitting control signals and data input using the input device 120 from the input device 120 to the image processing apparatus 200.

As shown in FIG. 9, the image processing apparatus 200 includes a controller 210, an input/output interface 220, a memory 230, and an image data manager 240, each of which is interconnected by a control and/or data bus 250. The links 110, 122 and 310 from the image data source 100, the input device 120 and the image data sink 300, respectively, are connected to the input/output interface 220. The electronic image data from the image data source 100, and any control and/or data signals from the input device 120, are input through the input interface 220, and, under control of the controller 210, are stored in the memory 230 and/or provided to the controller 210.

The memory 230 preferably has at least an alterable portion and may include a fixed portion. The alterable portion of the memory 230 can be implemented using static or dynamic RAM, a floppy disk and disk drive, a hard disk and disk drive, flash memory, or any other known or later developed alterable volatile or non-volatile memory device. If the memory includes a fixed portion, the fixed portion can be implemented using a ROM, a PROM, an EPROM, and EEPROM, a CD-ROM and disk drive, a DVD-ROM and disk drive, a writable optical disk and disk drive, or any other known or later developed fixed or non-volatile memory device.

The image data manager 240 analyzes the electronic data stored in the memory 230 and generates summed-area tables. The image data manager 240 then outputs processed electronic image data to the memory 230, or directly to the input/output interface 220, where the processed image data is output over the link 310 to the image data sink 300.

While FIG. 9 shows the image data manager 240 and the image data sink 300 as separate devices, the image data sink 300 could be integrated into the image processing apparatus 200. In various other exemplary embodiments, the image data manager 240 may be a separate device attachable upstream of a stand-alone image data sink 300.

Furthermore, the image data manager 240 may be implemented as hardware in, or as software executing on, the image processing apparatus 200 and/or the image data sink 300. Other configurations of the elements shown in FIG. 9 may be used without departing from the spirit and scope of this invention.

Figure 10:
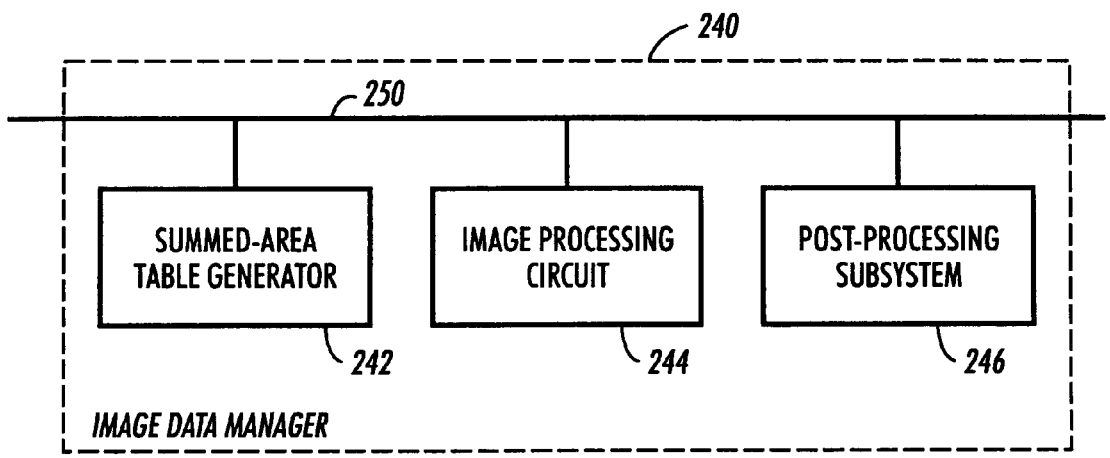
FIG. 10 shows in greater detail one exemplary embodiment of a functional block diagram of the memory of FIG. 9 in accordance with this invention.

FIG. 10 shows in greater detail one exemplary embodiment of a functional block diagram of the image data manager 240 of FIG. 9. As shown in FIG. 10, the image data manager 240 includes a summed-area table generator 242, an image processing circuit 244 and a post-processing subsystem 246. The summed-area table generator 242 analyzes and prepares the image prior to processing of the image by generating some or all of the various rectangular region and triangular region summed-area tables discussed above. The image processing circuit 244 processes the image using at least some of the various triangular-region summed-area tables such that the image is processed using non-rectangular regions. After the image has been processed, the post-processing subsystem 246 performs various processes on the processed image to generate an output image. The summed-area table generator 242, the image processing circuit 244 and the post-processing subsystem 246 are all connected to the data bus 250.

It should be appreciated that it is not necessary that the entire image be stored in memory, or that the summed area tables be completed in order or image processing to take place. It should be appreciated that processing may be conducted provided that sufficient summed-area table data has been generated to cover the image processing of the current pixel of interest. Thus, image can be streamed through the summed-area table generator, image processor, and post-processor while only storing the portions actually needed for the determinations.

Figure 11:
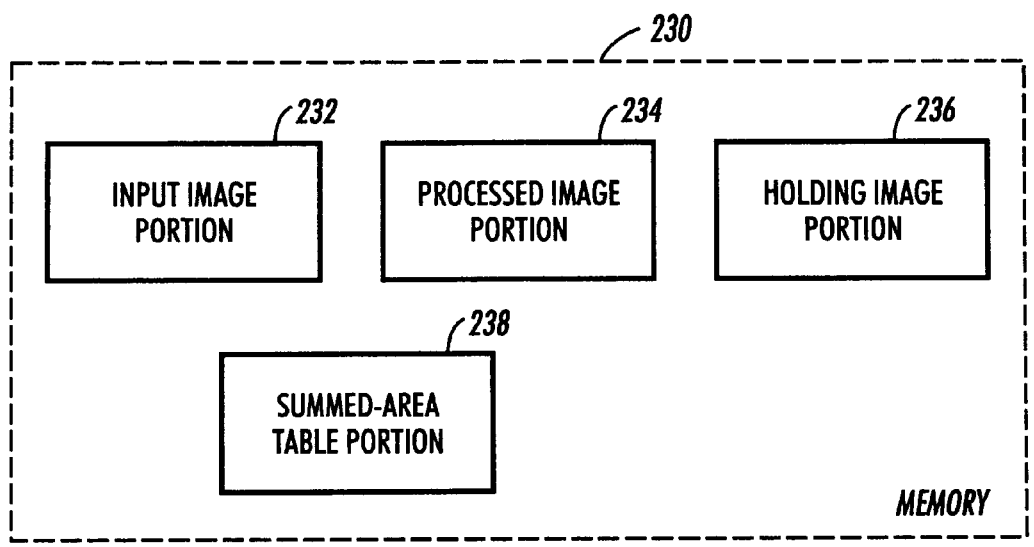
FIG. 11 shows in greater detail one exemplary embodiment of a functional block diagram of the image data manager of FIG. 9 in accordance with this invention.

FIG. 11 shows in greater detail one exemplary embodiment of the organization of the memory 230 of FIG. 9. As shown in FIG. 11, the memory 230 includes an input image portion 232, a processed image portion 234, a holding image portion 236, and a summed-area table portion 238. The input image portion 232 temporarily stores image data, prior to processing, that has been input into the image processing system 200. The processed image portion 234 temporarily stores processed image data that has been processed by the image processing system 200 prior to outputting the processed image. The holding image portion 236 stores image data on a long term basis either before or after processing. The image data stored in the input image portion 232 may be input from the image data source 100 through the input/output interface 220, or, alternatively, may result from converting an image previously stored in the image processing system 200, and specifically stored in the holding image portion 236. The summed-area table portion holds the summed-area table data created by the summed-area table generator 242 and used by the image processing circuit 244.

In operation, an image to be processed, i.e., an "original image" is input into the image processing system 200 or, alternatively, retrieved from the holding image memory 236 of the image processing system 200.

The summed-area table generator 242 generates at least a number of triangular-region summed-area tables. As a result, the image may be easily processed by the image processing circuit 244 in the image data analyzing circuit 240. It should be appreciated that the summed-area table generator 242 may generate the triangular-region summed-area tables using any of the various methods discussed above.

After the summed-area table generator 242 generates the various triangular-region, and possibly rectangular-region, summed-area tables, the image is processed using these summed-area tables. This process is performed by the image processing circuit 244. The image processing circuit 244 processes the image using any of a variety of known or later developed image processing methods.

Once the image is processed, the processed image is input to the post-processing subsystem 246 and further processed to generate an output image. This processed output image may be directly output to the image data sink 300. Alternatively, the image may be stored in the holding image portion 236 of the memory 230.

In accordance with this illustrative example using the image processing system 200, the process according to the invention is performed using a computer. However, it should be recognized that the systems and methods of the invention are not limited to application using a computer. Rather, the systems and methods according to the invention may be implemented using any suitable arrangement of electronic and imaging components, expert knowledge, or alternatively, a mixture of electronic and imaging components in conjunction with expert knowledge.

The image processing according to the invention may be applied to a variety of applications and environments. Further, it should be recognized that numerous variations of the systems and methods in accordance with the invention may be performed using the general process described in conjunction with FIGS. 9–11. Illustratively, further embodiments of the image processing process according to the systems and methods of the invention are described below. Each of these illustrative embodiments is performed by the image processing system 200. However, any suitable computer system or arrangement of imaging components may be used in the implementation of further embodiments.

Figure 12:
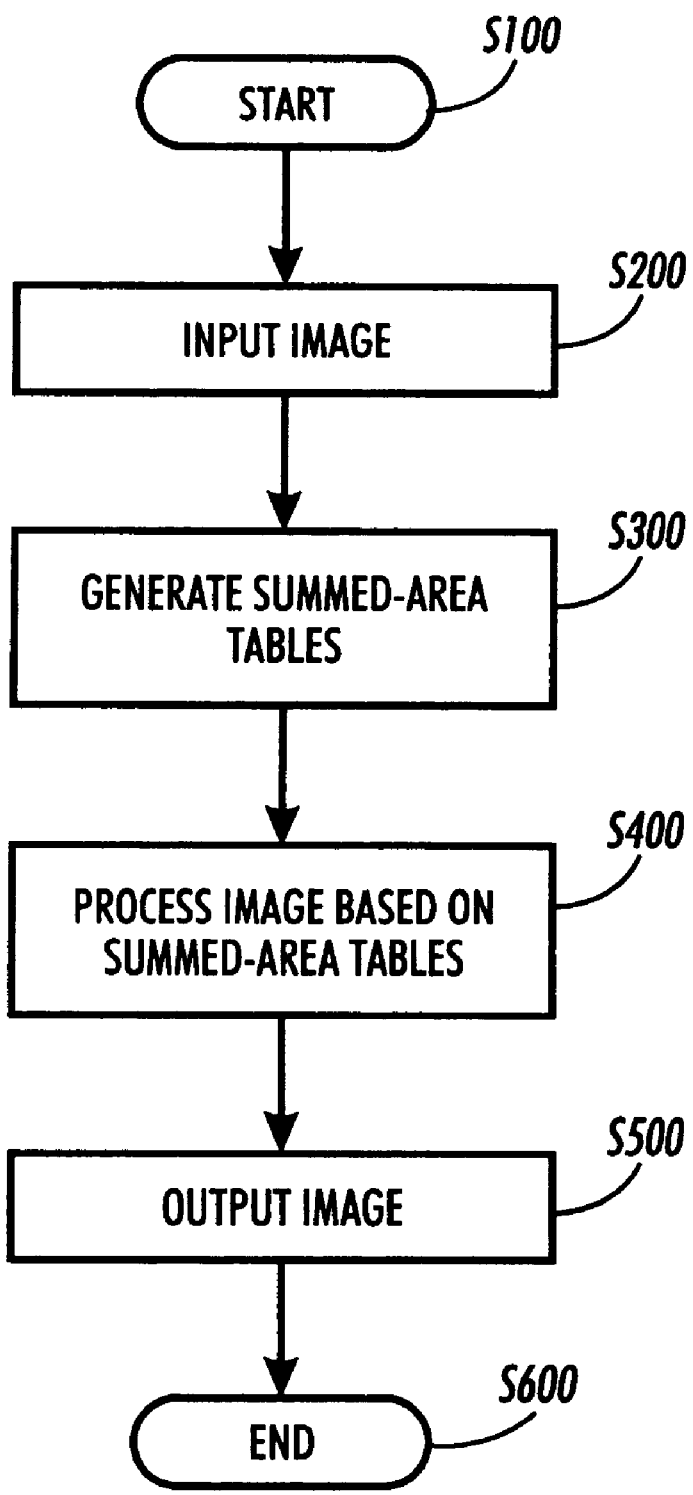
FIG. 12 is a flowchart outlining one exemplary embodiment of a method for processing an image in accordance with the methods and systems of this invention.

FIG. 12 is a flowchart outlining one exemplary embodiment of an image processing method according to this invention. As shown in FIG. 12, beginning in step S100, control continues to step S200, where an electronic image is input. Then, in step S300, a number of triangular-region and possibly rectangular-region, summed-area tables are generated. Next, in step S400, the image data is processed using the triangular-region, and possibly rectangular-region, summed-area tables. Control continues to step S500.

In step S500, the processed image is output to some suitable storage device or over a network, for example. Then, in step S600, the image processing method ends.

Figure 13:
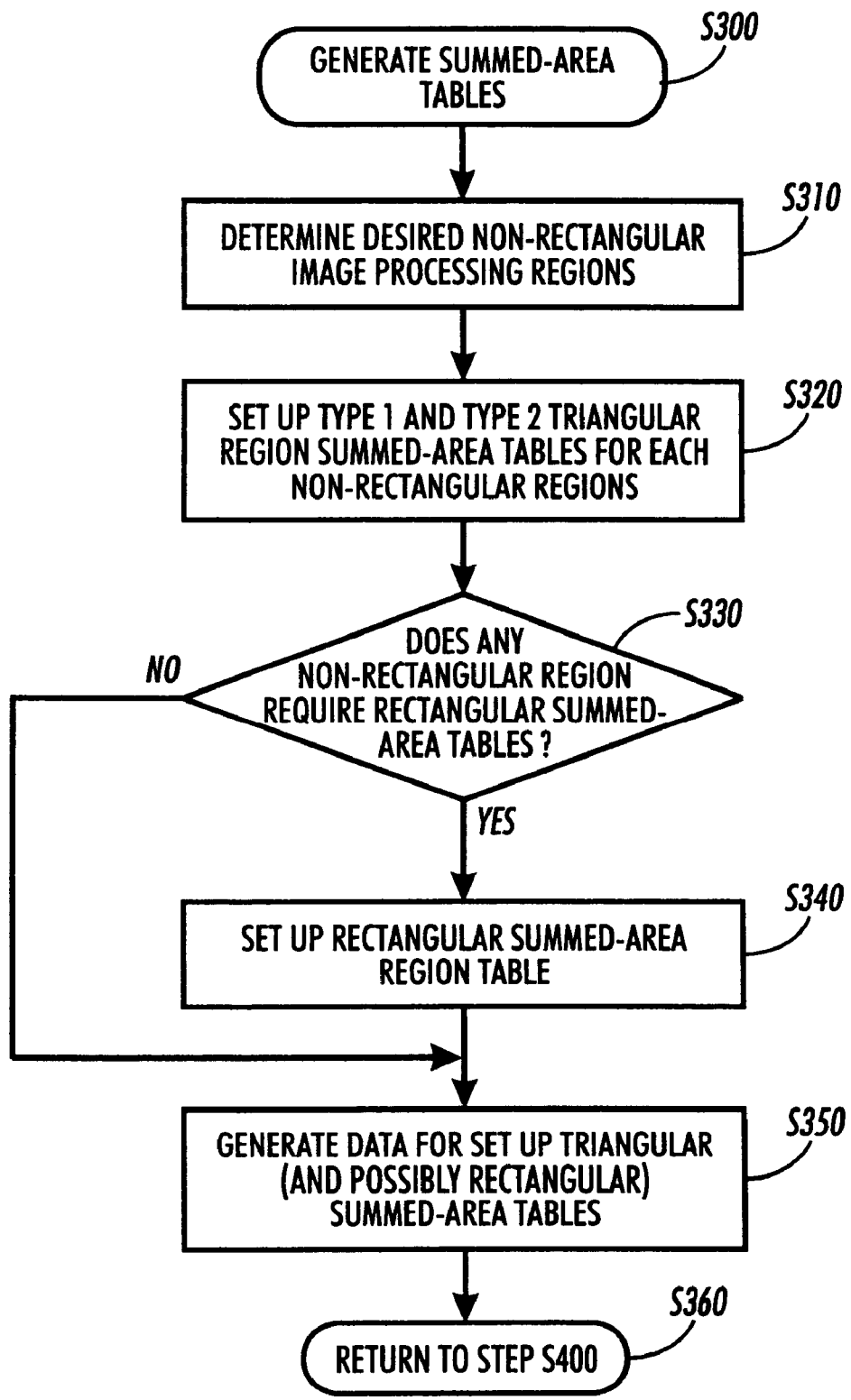
FIG. 13 is a flowchart outlining in greater detail one exemplary embodiment of a method for generating summed-area tables of FIG. 12.

FIG. 13 is a flowchart outlining in greater detail one exemplary embodiment of a method for generating summed-area tables of step S300. As shown in FIG. 13, beginning in step S300, control continues to step S310, where the desired non-rectangular image processing regions are determined. That is, polygonal regions such as the pentagonal regions, the hexagonal regions, the octagonal regions or the decagonal regions discussed above are determined. Then, in step S320, for each of the non-rectangular regions, at least one set of the type 1 and type 2 triangular summed-area tables are set up. Next, in step S330, the non-rectangular regions are analyzed to determine whether any rectangular summed-area tables are required. If so, control continues to step S340. Else, control jumps to step S350.

In step S340, the rectangular region summed-area table is set up. Then, in step S350, the data for the set-up summed-area tables is generated. That is, the data for summed-area tables for the triangular regions, and possibly rectangular regions, is generated. Next, in step S360, the control returns to step S400.

The image processing system 200 shown in FIGS. 9–11 is preferably implemented on a programmed general purpose computer. However, the image processing system 200 shown in FIGS. 9–11 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIGS. 12–13, can be used to implement the image processing system 200.

In particular, it should be understood that each of the circuits shown in FIGS. 9–11 can be implemented as portions of a suitably programmed general purpose computer. Alternatively, each of the circuits shown in FIGS. 9–11 can be implemented as physically distinct hardware circuits within an ASIC, or using a FPGA, a PDL, a PLA or a PAL, or using discrete logic elements or discrete circuit elements. The particular form each of the circuits shown in FIGS. 9–11 will take is a design choice and will be obvious and predicable to those skilled in the art.

The memory 230 is preferably implemented using static or dynamic RAM. However, the memory 230 can also be implemented using a floppy disk and disk drive, a writable optical disk and disk drive, a hard drive, flash memory or any other known or later developed alterable volatile or non-volatile memory device or system.

While this invention has been described in conjunction with specific embodiments outlined above, it is evident that many alternative modifications and variations may be apparent to those skilled in the art. Accordingly, the exemplary embodiments of the invention as set forth herein are intended to be illustrative, not limiting. Various changes may be made without departing from the spirit and scope of the invention.

What is claimed is:

1. A method for image processing, comprising:

receiving an image;

generating triangular-region summed-area tables from the received image;

processing the image using the generated triangular-region summed-area tables.

2. The method of claim 1, further comprising generating rectangular-region summed-area tables.

3. The method of claim 2, further comprising further processing the image using the generated rectangular-region summed-area tables.

4. The method of claim 1, wherein generating triangular-region summed-area tables comprises determining non-rectangular image processing regions.

5. The method of claim 4, further comprising, for each of the determined non-rectangular image processing regions, setting up at least one set of a plurality of types of triangular-region summed-area tables.

6. The method of claim 5, further comprising determining whether a rectangular-region summed-area table is required.

7. The method of claim 6, further comprising setting up the rectangular-region summed-area table.

8. A system for image processing, comprising:

an image receiver that receives an image;

a summed-area table generator that generates triangular-region summed-area tables from the received image;

an image processor that processes the image using the generated triangular-region summed-area tables.

9. The system of claim 7, wherein the summed-area table generator generates rectangular-region summed-area tables from the received image.

10. The system of claim 9, wherein the image processor processes the image using the generated rectangular-region summed-area tables.

11. The system of claim 8, further comprising a determinator that determines non-rectangular image processing regions.

12. The system of claim 11, further comprising, for each of the determined non-rectangular image processing regions, a set-up device that sets up at least one set of a plurality of types of triangular-region summed-area tables.

13. The system of claim 12, wherein the determinator further determines whether a rectangular-region summed-area table is required.

14. The system of claim 13, wherein the set-up device further sets up the rectangular-region summed-area table.

* * * * *